United States Patent
Horiuchi et al.

(10) Patent No.: US 9,604,865 B2
(45) Date of Patent: Mar. 28, 2017

(54) BASE MATERIAL FOR DISK PROCESS FOR PRODUCING THE SAME, AND DISK ROLL

(71) Applicant: Nichias Corporation, Tokyo (JP)

(72) Inventors: Osamu Horiuchi, Shizuoka (JP); Kazuhisa Watanabe, Shizuoka (JP); Masaaki Nakayama, Shizuoka (JP)

(73) Assignee: NICHIAS CORPORATION, Tokyo (JP)

( * ) Notice: Subject to any disclaimer, the term of this patent is extended or adjusted under 35 U.S.C. 154(b) by 268 days.

(21) Appl. No.: 14/306,262

(22) Filed: Jun. 17, 2014

(65) Prior Publication Data

US 2014/0291892 A1    Oct. 2, 2014

Related U.S. Application Data

(60) Division of application No. 13/067,011, filed on May 2, 2011, now Pat. No. 8,827,883, which is a (Continued)

(30) Foreign Application Priority Data

Nov. 6, 2008    (JP) ................................ 2008-285282

(51) Int. Cl.
*C03B 13/16*    (2006.01)
*B65H 27/00*    (2006.01)
(Continued)

(52) U.S. Cl.
CPC ............. *C03B 13/16* (2013.01); *B65H 27/00* (2013.01); *C04B 33/36* (2013.01); *F16C 13/00* (2013.01); *B65H 2402/80* (2013.01); *B65H 2404/1321* (2013.01); *C04B 2235/3472* (2013.01); *C04B 2235/5228* (2013.01); *C04B 2235/5264* (2013.01); *C04B 2235/602* (2013.01); *C04B 2235/608* (2013.01); *C04B 2235/9607* (2013.01); *Y10T 428/21* (2015.01)

(58) Field of Classification Search
CPC .... B65H 2402/80; B65H 27/00; C04B 33/36; C03B 13/16
See application file for complete search history.

(56) References Cited

U.S. PATENT DOCUMENTS

2,917,426 A    12/1959  Bugosh
3,354,031 A    11/1967  Kozacik
(Continued)

FOREIGN PATENT DOCUMENTS

CN    101010262    8/2007
EP    1795505    6/2007
(Continued)

OTHER PUBLICATIONS

Chinese Office Action issued in CN App. No. 201410185872.X dated Dec. 2, 2015.
(Continued)

*Primary Examiner* — Jacob Cigna
(74) *Attorney, Agent, or Firm* — Nixon & Vanderhye P.C.

(57) ABSTRACT

A process for producing a base material for disks including forming a raw slurry material into a platy shape and drying the plate, the raw slurry material containing inorganic fibers which have a wet volume of about 300 mL/5 g or larger and which are amorphous or have a degree of crystallinity of about 50% or lower.

10 Claims, 1 Drawing Sheet

Related U.S. Application Data continuation-in-part of application No. 12/612,278, filed on Nov. 4, 2009, now Pat. No. 9,388,008.

(51) Int. Cl.
*F16C 13/00* (2006.01)
*C04B 33/36* (2006.01)

(56) References Cited

U.S. PATENT DOCUMENTS

| | | |
|---|---|---|
| 3,749,638 A | 7/1973 | Renaud |
| 3,954,556 A | 5/1976 | Jackson et al. |
| 4,244,781 A | 1/1981 | Heckman |
| 4,487,631 A | 12/1984 | Britt et al. |
| 4,533,581 A | 8/1985 | Asaumi et al. |
| 5,322,537 A | 6/1994 | Nakamura et al. |
| 5,380,580 A | 1/1995 | Rogers et al. |
| 5,579,296 A | 11/1996 | Smith et al. |
| 6,896,646 B2 | 5/2005 | Kaiser et al. |
| 7,284,328 B2 | 10/2007 | Kaiser |
| 7,306,773 B2 | 12/2007 | Tanaka et al. |
| 7,507,194 B2 | 3/2009 | Neubauer et al. |
| 7,781,043 B2 | 8/2010 | Nakayama et al. |
| 2001/0024626 A1 | 9/2001 | TenEyck |
| 2003/0162019 A1 | 8/2003 | Zoitos et al. |
| 2003/0185723 A1 | 10/2003 | Anji et al. |
| 2003/0185724 A1 | 10/2003 | Anji et al. |
| 2004/0007021 A1 | 1/2004 | Igo et al. |
| 2004/0220032 A1 | 11/2004 | Nakayama et al. |
| 2007/0231526 A1 | 10/2007 | Nakayama et al. |
| 2008/0120995 A1 | 5/2008 | Neubauer et al. |
| 2010/0064729 A1 | 3/2010 | Nakayama et al. |
| 2010/0113238 A1 | 5/2010 | Horiuchi et al. |
| 2010/0240511 A1 | 9/2010 | Nakayama et al. |
| 2011/0259538 A1 | 10/2011 | Nakayama et al. |
| 2011/0287915 A1 | 11/2011 | Horiuchi et al. |

FOREIGN PATENT DOCUMENTS

| | | |
|---|---|---|
| JP | 58-156717 A | 9/1983 |
| JP | 64-61371 | 3/1989 |
| JP | 01-119616 | 5/1989 |
| JP | 01-303261 | 12/1989 |
| JP | 05-099574 | 4/1993 |
| JP | 09-048628 | 2/1997 |
| JP | 2000-095536 | 4/2000 |
| JP | 2003-293754 | 10/2003 |
| JP | 2004-043240 | 2/2004 |
| JP | 2004-269281 | 9/2004 |
| JP | 2004-299980 | 10/2004 |
| JP | 2005-515307 | 5/2005 |
| JP | 2007-269604 | 10/2007 |
| JP | 2010-095437 A | 4/2010 |
| JP | 2010-111541 A | 5/2010 |
| TW | 255965 B | 9/1995 |
| TW | I252207 B | 4/2006 |
| TW | I263611 B | 10/2006 |
| TW | M304751 U | 1/2007 |

OTHER PUBLICATIONS

Office Action issued in Taiwanese Application No. 098137704 dated Mar. 23, 2015.
JP Office Action with partial English translation in JP 2008-285282 dated Jul. 3, 2012.
UNIFRAX Product Information sheet, http://www.fiberfrax.com/ 2006.
Search and Examination Report in Singapore Appln. SN 200907294-3 mailed Oct. 1, 2012.
U.S. Appl. No. 12/612,278.
U.S. Appl. No. 13/111,116.
U.S. Appl. No. 13/067,836.
U.S. Appl. No. 12/801,166.
FIBERFRAX UNIFRAX product sheet; http://www.fiberfrax.com/files/Fiberfrax-Bulk-Fiber.pdf (copyright 2007) ret. 8 Jan. 2014.

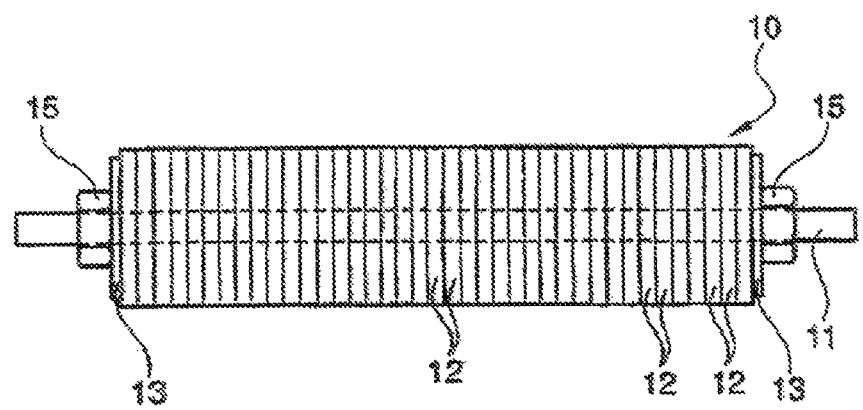

BASE MATERIAL FOR DISK PROCESS FOR PRODUCING THE SAME, AND DISK ROLL

This application is a divisional of application Ser. No. 13/067,011 filed May 2, 2011, now allowed, which in turn is a continuation-in-part of application Ser. No. 12/612,278, filed Nov. 4, 2009, which in turn claims priority of JP 2008-285282 filed Nov. 6, 2008, the entire content of each of which is hereby incorporated by reference in this application.

FIELD OF THE INVENTION

The present invention relates to a disk roll which comprises a rotating shaft and ring-shaped disks fitted thereon by insertion, whereby the peripheral surface of the disks serves as a conveying surface. The invention further relates to a base material for the disks and relates to a process for producing the base material.

BACKGROUND OF THE INVENTION

Disk rolls are used, for example, for conveying a glass plate descending from a melting furnace or for conveying a metal plate, e.g., a stainless-steel plate, heated in an annealing furnace. A disk roll is built in the following manner. Ring-shaped disks containing inorganic fibers and an inorganic filler are fitted by insertion onto a metallic shaft serving as a rotating shaft. Thus, a roll-form stack is obtained. The whole stack is pressed through flanges disposed respectively on both ends, and the disks in this slightly compressed state are fastened with nuts. In the disk roll thus obtained, the peripheral surface of the disks functions as a conveying surface (see, for example, Patent Documents 1 and 2).
Patent Document 1: JP-A-2004-299980
Patent Document 2: JP-A-2004-269281

SUMMARY OF THE INVENTION

However, such disk rolls have the following problems. The glass plates or stainless-steel plates to be conveyed have increased in area in these days and, hence, the conveyance time per plate has become longer. The time period of contact with the disks also has become longer. Because of this, the disks heat up to a higher temperature than before and have a larger difference than before in temperature between before and after the conveyance, i.e., between the time when the disks are in contact with a glass plate or stainless-steel plate and the time when the contact has terminated. In periodic inspections also, there are cases where the disks are rapidly cooled.

In such cases, the disks thermally shrink before the metallic shaft, which has a high heat capacity, thermally shrinks. There is hence a fear that disk separation (the phenomenon in which a gap is formed between disks) may occur and the roll surface (conveying surface) may crack due to a thermal stress attributable to a temperature difference (difference in thermal expansion) between the outside (surface) and the inside (inner parts) of the disks.

An object of the invention is to provide a disk roll which, even when rapidly cooled, hardly suffers disk separation or cracking and which has excellent spalling resistance.

Namely, the present invention relates to the followings.

1. A process for producing a base material for obtaining therefrom ring-shaped disks for use in a disk roll comprising a rotating shaft and the ring-shaped disks fitted thereon by insertion, whereby the peripheral surface of the disks serves as a conveying surface, the process comprising forming a raw slurry material into a platy shape and drying the plate, the raw slurry material comprising inorganic fibers which have a wet volume of about 300 mL/5 g or larger and which are amorphous or have a degree of crystallinity of about 70% or lower.

2. The process for producing a base material for disks according to 1, wherein the inorganic fibers have an average fiber diameter of about 2 μm-about 7 μm.

3. The process for producing a base material for disks according to 1 or 2, wherein the inorganic fibers are alumina fibers or mullite fibers.

4. The process for producing a base material for disks according to any one of 1 to 3, wherein the raw slurry material further comprises an inorganic filler.

5. The process for producing a base material for disks according to 4, wherein the inorganic filler is selected from Kibushi clay, bentonite, mica, alumina, cordierite, kaolin clay, wollastonite and talc.

6. The process for producing a base material for disks according to 4, wherein the inorganic filler comprises Kibushi clay and bentonite.

7. The process for producing a base material for disks according to 6, wherein the inorganic filler further comprises mica, alumina, cordierite, kaolin clay or wollastonite.

8. The process for producing a base material for disks according to any one of 1 to 7, wherein the raw slurry material further comprises starch and pulp.

9. A disk for use in a disk roll comprising a rotating shaft and ring-shaped disks fitted thereon by insertion, whereby the peripheral surface of the ring-shaped disks serves as a conveying surface, the disk comprising inorganic fibers which are amorphous or have a degree of crystallinity of about 70% or lower and which have an average fiber diameter of about 2 μm to about 7 μm, and having a recovery ratio of about 10% to about 100%.

10. The disk for use in a disk roll according to 9, wherein the inorganic fibers are alumina fibers or mullite fibers.

11. The disk for use in a disk roll according to 9 or 10, wherein the disk comprises about 20% by mass to about 70% by mass of the inorganic fibers and about 30% by mass to about 70% by mass of an inorganic filler.

12. The disk for use in a disk roll according to 11, wherein the disk comprises about 20% by mass to about 50% by mass of the inorganic fibers and about 40% by mass to about 70% by mass of the inorganic filler.

13. The disk for use in a disk roll according to 11 or 12, wherein the inorganic filler is selected from Kibushi clay, bentonite, mica, alumina, cordierite, kaolin clay, wollastonite and talc.

14. The disk for use in a disk roll according to 13, wherein the kaolin clay is fired kaoline.

15. The disk for use in a disk roll according to 11 or 12, wherein the inorganic filler comprises Kibushi clay and bentonite.

16. The disk for use in a disk roll according to 15, wherein the inorganic filler further comprises mica, alumina, cordierite, kaolin clay or wollastonite.

17. The disk for use in a disk roll according to 11 or 12, wherein the inorganic filler comprises about 2% by mass to about 30% by mass of the Kibushi clay, about 2% by mass to about 20% by mass of the bentonite and about 20% by mass to about 40% by mass of the mica, alumina, cordierite, kaolin clay or wollastonite.

18. The disk for use in a disk roll according to any one of 9 to 17, wherein the disk further comprises starch and pulp.

19. A disk roll which comprises a rotating shaft and a plurality of disks according to any one of 9 to 18 fitted thereon by insertion.

20. The disk roll according to 19, wherein the disks have a compressed density of about 0.6 g/cm$^3$ to about 1.6 g/cm$^3$.

21. A method for producing a glass by using the disk roll according to 19 or 20.

BRIEF DESCRIPTION OF THE DRAWINGS

FIG. 1 is a diagrammatic view illustrating one embodiment of the disk roll.

DETAILED DESCRIPTION OF THE INVENTION

The invention is explained below in detail by reference to the drawing.

Base Material for Disk

The invention provides a base material for disks which is for producing therefrom the disks 12 constituting a disk roll 10 such as that shown in FIG. 1. The base material for disks of the invention is obtained by forming a slurry containing inorganic fibers into a platy shape and drying the plate.

The inorganic fibers are a mixture of fibers having various lengths. The fiber lengths of the inorganic fibers are roughly expressed by a wet volume. The wet volume is calculated by the following method having the following steps:

(1) 5 grams of a dried fiber material is weighed by weigher with accuracy of two or more decimal places;

(2) The weighed fiber material is placed in a 500 ml glass beaker;

(3) About 400 cc of distilled water having a temperature of 20 to 25° C. is poured into the glass beaker prepared in the step (2), and stirring is carefully performed by using a stirrer so as not to cut the fiber material, thereby dispersing the fiber material. For this dispersion, an ultrasonic cleaner may be used;

(4) The content of the glass beaker prepared in the step (3) is transferred into a 1,000 ml graduated measuring cylinder, and distilled water is added thereto up to the scale of 1,000 cc;

(5) Stirring of the graduated measuring cylinder prepared in the step (4) is performed by turning the cylinder upside down while blocking an opening of the graduated measuring cylinder with the palm of a hand carefully to prevent water from leaking out. This procedure is repeated 10 times in total;

(6) the sedimentation volume of fiber is measured by visual observation after standing the graduated measuring cylinder under room temperature for 30 minutes after the stop of the stirring; and (7) The above-mentioned operation is performed for 3 samples, and an average value thereof is taken as a measured value.

The larger the wet volume, the longer the fiber length. In the invention, inorganic fibers having a wet volume of preferably about 100 mL/5 g or larger, more preferably about 250 mL/5 g or larger, even more preferably about 300 mL/5 g or larger, particularly preferably 400 mL/5 g or larger, most preferably 500 mL/5 g or larger are used. There is no particular upper limit on the wet volume thereof so long as the effects of the invention are obtained. For example, the wet volume of the inorganic fibers may be about 2,000 mL/5 g or smaller, preferably about 1,500 mL/5 g or smaller, more preferably about 1,200 mL/5 g or smaller. Inorganic fibers are mixed with stirring with an inorganic filler and other ingredients in water in order to slurry the inorganic fibers, and are hence cut during the stirring, whereby the disks obtained therefrom contain inorganic fibers having a short fiber length. Because of this, such disks have low resiliency and are incapable of adapting to abrupt temperature changes, resulting in disk separation or cracking. In contrast, the inorganic fibers, which have the wet volume shown above, are bulk short fibers. Even when stirred and mixed in slurry formation, the inorganic fibers to be used in the invention remain longer than the inorganic fibers used hitherto. The disks obtained therefrom also contain relatively long inorganic fibers and, hence, the flexibility of the inorganic fibers can be maintained/exhibited. As a result, the stress attributable to a difference in thermal expansion can be mitigated/absorbed, and the spalling resistance of a disk roll can be improved.

In the invention, the inorganic fibers are preferably an amorphous material, i.e., have a degree of crystallinity of 0%, or have a degree of crystallinity of about 70% or lower, preferably about 50% or lower. The lower the degree of crystallinity of inorganic fibers, the higher the strength of the fibers. Consequently, the inorganic fibers are less apt to break even when the fibers are stirred in the slurry or receive compressive force in a roll building step. The disks can hence retain recovery force. As a result, disks having high strength and a high recovery ratio are obtained. From the standpoint of obtaining such effects without fail, the upper limit of the degree of crystallinity of the inorganic fibers is preferably about 30% or lower, more preferably about 20% or lower, even more preferably about 10% or lower. Most preferably, the inorganic fibers are amorphous inorganic fibers. In the invention, the degree of crystallinity may be determined by X-ray diffractometry, in which the internal standard method is used to draw a calibration curve for mullite to determine the degree of crystallinity.

The average fiber diameter of the inorganic fibers is not particularly limited so long as the effects of invention are obtained. However, it is preferred that the inorganic fibers be relatively thick inorganic fibers having an average fiber diameter of about 2 to about 7 μm, about 3 to about 7, or about 4 to about 7 μm. Such thick inorganic fibers have excellent fiber strength and are hence less apt to break even when the inorganic fibers are stirred in the slurry or receive compressive force in a roll building step. Therefore, the inorganic fibers enable the disks to retain recovery force.

As a result, a base material having high strength and a high recovery ratio can be provided.

The composition of the inorganic fibers is not particularly limited so long as the effects of the invention are obtained. However, $Al_2O_3:SiO_2$ is preferably from about 60:about 40 to about 99:about 1. Inorganic fibers having such a composition are called alumina fibers or mullite fibers. These inorganic fibers have high heat resistance and, hence, can give disks having a low degree of thermal dimensional change. In particular, mullite fibers in which $Al_2O_3:SiO_2$ is from about 70:about 30 to about 75:about 25 have an excellent balance among heat resistance, fiber strength, and cost and are hence apt to retain a long fiber length even after a forming step and a roll building step. Consequently, these mullite fibers are suitable for use in the invention.

The slurry may contain an inorganic filler or inorganic binder in addition to the inorganic fibers Suitable examples of the inorganic filler include mica, Kibushi clay, bentonite, alumina, cordierite, kaolin clay (fired kaolin or the like), talc and wollastonite. The slurry preferably contains Kibushi clay and bentonite as the inorganic filler. The slurry preferably further contains one or more selected from mica, alumina, cordierite, kaolin clay, talc and wollastonite. Suitable inorganic binders are silica sol and alumina sol because of their excellent heat resistance. Besides these ingredients, forming aids may be added, such as an organic binder, e.g., starch, organic fibers, e.g., a pulp, and a flocculant, e.g., a montmorillonite powder. The remainder is water.

The slurry may consist essentially of the above mentioned ingredients.

For the solid composition of the slurry, the slurry contains preferably about 20% by mass or more, about 25% by mass or more, or about 30% by mass or more, and preferably about 70% by mass or less, more preferably about 60% by mass or less, further preferably about 50% by mass or less of the inorganic fibers. In case where the proportion of the inorganic fibers is too low, there is a fear that the resiliency attributable to the inorganic fibers is not obtained and the expected recovery ratio which will be described later cannot be obtained after roll building. In case where the proportion of the inorganic fibers is too high, there is a fear that it is difficult to evenly disperse the inorganic fibers in the slurry and the disk base material obtained may have enhanced unevenness of properties or poor wearing resistance. The slurry preferably contains 0% to about 10% by mass of the inorganic binder. The slurry contains preferably about 30 to about 70% by mass, more preferably about 40 to about 70% by mass, further preferably about 50 to about 70% by mass of the inorganic filler. Specifically, the slurry contains for example about 2 to about 30% by mass, or about 2 to about 20% by mass of Kibushi clay. When Kibushi clay is contained, the surface lubricity (smoothness) of the disk is improved. The slurry contains for example about 2 to about 30% by mass, or about 2 to about 20% by mass of the bentonite. When the bentonite is contained, the drainage is improved. The slurry contains for example about 20 to about 50% by mass, about 20 to about 45% by mass, or about 25 to about 40% by mass of one or more selected from mica, alumina, cordierite, kaolin clay, talc and wollastonite With regard to the forming method, a papermaking method or a dehydrating molding method in which the slurry is supplied to one surface of a molding die, e.g., a metal gauze, while conducting suction from the other surface, may be mentioned. However, in the case where such a slurry containing the relatively long bulk short fibers described above is forming, large flocs are apt to generate as a result of the coagulation of solid matters contained in the slurry and the filtration resistance is apt to be lowered. The dehydrating molding method is hence advantageous. However, in the case where the amount of the inorganic fibers is small (e.g., 20% by mass or smaller), a papermaking method is also possible. The papermaking method is advantageous from the standpoint of cost.

After the forming, the resultant platy object is dried to obtain a base material for disks. The density of this base material for disks is not particularly limited so long as the effects of the invention are obtained. However, the density thereof may be about 0.3 to about 1.0 $g/cm^3$, and is more preferably about 0.4 to about 0.8 $g/cm^3$, especially preferably about 0.45 to about 0.7 $g/cm^3$. This is because the lower the bulk density of the disks relative to the compressed density of the disk roll to be produced, the higher the compressibility and the better the recovery force of the disk roll. The adequate thickness of the base material for disks may be 2-10 mm in the case of the papermaking method, and may be 10-35 mm in the case of the dehydrating molding method. Larger thicknesses of the base material for disks are advantageous from the standpoint of production because a smaller number of disks suffice for fitting on a shaft.

Disk

The invention further provides a disk obtained by punching a ring shape out of the base material for disks described above. Namely, the disk of the invention preferably has the above solid composition, the above crystallinity and the average fiber diameter. This constitution enables the disk to retain a high recovery ratio and have improved spalling resistance. Specifically, the lower limit of the recovery ratio of the disk is preferably about 5%, about 8%, about 10% or about 20%, and the upper limit thereof is preferably about 100%, about 90%, about 80%, about 70% about 60% or about 50%. The higher lower limit and lower upper limit are preferable. In the invention, the recovery ratio of disks is determined in the following manner. Disks having an outer diameter of 130 mm and an inner diameter of 65 mm are fitted onto a stainless-steel shaft having a diameter of 65 mm and a length of 1,000 mm at a compressed density of 1.25 $g/cm^3$ to build a disk roll. This disk roll is rotated at a rotation speed of 5 rpm for 150 hours with heating at 900° C., and then cooled to room temperature, i.e., 25° C. Thereafter, the compressive force applied to the disks is removed. The recovery ratio is determined by dividing the length recovered upon the compressive-force removal by the original length.

Disk Roll

The invention furthermore provides a disk roll 10 obtained by fitting disks 12 described above, by insertion, onto a metallic shaft 11 serving as a rotating shaft to obtain a roll-form stack, fixing the whole stack in the state of being compressed from both ends, pressing the whole stack through flanges 13 disposed respectively on both ends, and fastening these disks 12 in this slightly compressed state with nuts 15, as shown in FIG. 1, for example. The compressed density of the disks, i.e., the density of the disks in the state of being compressed from both sides, is not particularly limited so long as the effects of the invention are obtained. However, the compressed density thereof may be about 0.6 to about 1.6 $g/cm^3$, and is more preferably about 0.7 to about 1.5 $g/cm^3$, especially preferably about 1.1 to about 1.4 $g/cm^3$. Such compressed density is preferred because this disk roll not only has satisfactory spalling resistance and can retain the wearing resistance required of conveying rolls but also has such a surface hardness that the work being conveyed is not marred. That compressed density enables the advantages of the base material obtained according to the invention to be sufficiently exhibited. The spalling resistance is preferably 2 times or more and more preferably 3 times or more.

The surface hardness of the disk roll of the invention is not particularly limited so long as the effects of the invention are obtained. However, the surface hardness thereof may be 25-65 in terms of Type D Durometer hardness, and may be preferably 30-60, more preferably 35-55. Type D Durometer hardness (hardness meter Durometer Type D) may be measured, for example, with "ASKER Type D Rubber Hardness Meter" (manufactured by Kobunshi Keiki Co., Ltd.).

A glass or the like can be produced by using the disk roll of the invention. Specifically, the disk roll can be used for conveying a plate such as glass descending from a melting furnace or a metal plate while holding the plate therebetween.

EXAMPLES

The invention will be further explained below by reference to Test Examples. However, the invention should not be construed as being limited by the following Test Examples in any way.

Test 1

Aluminosilicate fibers or mullite fibers were added to water together with inorganic fillers and forming (molding) aids in the amounts (weight %) shown in Table 1, and the ingredients were sufficiently stirred and mixed to prepare a slurry. The wet volumes of the aluminosilicate fibers and mullite fibers were determined by the method described above. The degree of crystallinity thereof was determined by X-ray diffractometry, in which the internal standard method was used to draw a calibration curve for mullite.

Each of the slurries thus prepared was formed into a plate shape by the dehydrating molding method or the papermaking method and dried to produce a base material for disks. The base material was evaluated for the following properties. The results obtained were also shown in Table 1.

(1) Degree of Thermal Dimensional Change

A test piece was punched out of each base material for disks. The test piece was heated at 700° C. or 900° C. and then the diameter was measured. The degree of thermal change in the length-direction (diameter-direction) dimension from a value measured before the heating was determined.

(2) Recovery Ratio

Disks having an outer diameter of 130 mm and an inner diameter of 65 mm were punched out of each base material for disks, and fitted onto a stainless-steel shaft having a diameter of 65 mm and a length of 1,000 mm to build a roll so as to result in a compressed density of 1.25 g/cm$^3$. This roll was rotated at 900° C. and a rotation speed of 5 rpm for 150 hours and then cooled to room temperature, i.e., 25° C. Thereafter, the compressive force applied to the disks was removed. The recovery ratio (%) was determined by dividing the length recovered upon the compressive-force removal by the original length.

(3) Wearing Resistance (Hot Wearing test)

Ring-shaped disks having an outer diameter of 80 mm were punched out of each base material for disks and fitted onto a stainless-steel shaft to build a roll so as to result in a width of 100 mm and a desired compressed density. This roll was rotated at 900° C. for 5 hours while a stainless-steel shaft having a diameter of 30 mm and having five grooves with a width of 2 mm formed at an interval of 2 mm was kept in contact with the roll surface. Thereafter, the roll was cooled to room temperature, i.e., 25° C., and the resultant wear loss (mm) was measured.

(4) Spalling Resistance

Ring-shaped disks having an outer diameter of 60 mm were punched out of each base material for disks and fitted onto a stainless-steel shaft to build a roll so as to result in a width of 100 mm and a desired compressed density. This roll was placed in an electric furnace kept at 900° C. After 15 hours, the roll was taken out of the furnace and rapidly cooled to room temperature, i.e., 25° C. This heating/rapid-cooling operation was repeated, and the number of such operations required for the roll to undergo disk separation or cracking was counted.

TABLE 1

| | | Composition | Wet volume (mL/5 g) | Average Fiber diameter (μm) | Degree of crystallinity (%) | Experiment 1 | Experiment 2 | Experiment 3 | Experiment 4 | Experiment 5 | Experiment 6 |
|---|---|---|---|---|---|---|---|---|---|---|---|
| Formulation (parts by mass) | Inorganic fibers | Aluminosilicate | 850 | 2.5 | 0 | | | | 40 | | |
| | | | 20 | 2.5 | 0 | | | | | 40 | |
| | | Mullite | 970 | 3.0 | 0 | | | 40 | | | |
| | | | 990 | 5.0 | 0 | 40 | | | | | |
| | | | 530 | 5.0 | 0 | | 40 | | | | |
| | | | 200 | 5.0 | 80 | | | | | | 40 |
| | Inorganic filler | Mica | | | | 30 | 30 | 30 | 30 | 30 | 30 |
| | | Kibushi clay | | | | 10 | 10 | 10 | 10 | 10 | 10 |
| | | Bentonite | | | | 10 | 10 | 10 | 10 | 10 | 10 |
| | Forming aid | Pulp | | | | 5 | 5 | 5 | 5 | 5 | 5 |
| | | Organic binder | | | | 5 | 5 | 5 | 5 | 5 | 5 |
| Property | Disk | Density (g/cm$^3$) | | | | 0.62 | 0.6 | 0.56 | 0.61 | 0.54 | 0.6 |
| | | Degree of thermal dimensional change (%) | 700° C. | | | 0.0 | 0.0 | 0.0 | 0.0 | −0.1 | 0.0 |
| | | | 900° C. | | | 0.1 | 0.0 | 0.1 | 0.2 | 0.1 | 0.1 |
| | | Forming method | | | | dehydrating molding with suction | dehydrating molding with suction | dehydrating molding with suction | dehydrating molding with suction | papermaking | dehydrating molding with suction |
| | Disk roll | Compressed density (g/cm$^3$) | | | | 1.25 | 1.25 | 1.25 | 1.25 | 1.25 | 1.25 |
| | | Recovery ratio (%) | | | | 30 | 24 | 12 | 10 | 2 | 7 |
| | | Surface hardness (Shore D) | | | | 38 | 35 | 32 | 59 | 46 | 42 |
| | | Wearing resistance (hot wearing test) | | | | 0.3 | 0.3 | 1.4 | 0.2 | 0.2 | 9.4 |
| | | Evaluation of spalling resistance | | | | 8 times | 14 times | 6 times | 4 times | 2 times | 2 times |

Test 2

As shown in Table 2, slurries were prepared using, in various amounts, amorphous mullite fibers having a wet volume of 530 mL/5 g. The disks obtained therefrom were evaluated like Test 1. The results obtained are also shown in Table 2.

TABLE 2

|  |  | Composition | Wet volume (mL/5 g) | Average fiber diameter (μm) | Degree of crystallinity (%) | Experiment 7 | Experiment 8 | Experiment 9 | Experiment 10 | Experiment 11 | Experiment 12 |
|---|---|---|---|---|---|---|---|---|---|---|---|
| Formulation (parts by mass) | Inorganic fibers | Mullite | 530 | 5.0 | 0 | 20 | 30 | 40 | 50 | 60 | 70 |
|  | Inorganic filler | Mica |  |  |  | 30 | 30 | 30 | 20 | 10 | 0 |
|  |  | Kibushi clay |  |  |  | 30 | 20 | 10 | 10 | 10 | 10 |
|  |  | Bentonite |  |  |  | 10 | 10 | 10 | 10 | 10 | 10 |
|  | Forming aid | Pulp |  |  |  | 5 | 5 | 5 | 5 | 5 | 5 |
|  |  | Organic binder |  |  |  | 5 | 5 | 5 | 5 | 5 | 5 |
| Property | Disk | Density (g/cm$^3$) |  |  |  | 0.72 | 0.64 | 0.6 | 0.52 | 0.44 | 0.32 |
|  |  | Degree of thermal dimensional change (%) | 700° C. |  |  | −0.1 | 0.0 | 0.0 | 0.0 | 0.0 | 0.0 |
|  |  |  | 900° C. |  |  | −0.2 | 0.0 | 0.0 | 0.0 | 0.1 | 0.2 |
|  |  | Forming method |  |  |  | paper-making | dehydrating molding with suction | dehydrating molding with suction | dehydrating molding with suction | dehydrating molding with suction | dehydrating molding with suction |
|  | Disk roll | Compressed density (g/cm$^3$) |  |  |  | 1.25 | 1.25 | 1.25 | 1.25 | 1.25 | 1.25 |
|  |  | Recovery ratio (%) |  |  |  | 12 | 17 | 24 | 30 | 33 | 36 |
|  |  | Surface hardness (Shore D) |  |  |  | 37 | 34 | 35 | 35 | 31 | 33 |
|  |  | Wearing resistance (hot wearing test) |  |  |  | 0.3 | 0.2 | 0.3 | 5 | 8 | 12 |
|  |  | Evaluation of spalling resistance |  |  |  | 2 times | 5 times | 14 times | 12 times | 13 times | 14 times |

Test 3

Disks were produced using the same formulation as in Experiment 2 in Test 1. Disk rolls having different compressed densities as shown in Table 3 were produced and evaluated like Test 1. The results obtained are also shown in Table 3.

TABLE 3

|  |  |  | Experiment 13 | Experiment 14 | Experiment 15 | Experiment 16 | Experiment 17 | Experiment 18 | Experiment 19 |
|---|---|---|---|---|---|---|---|---|---|
| Property | Disk roll | Compressed density (g/cm$^3$) | 0.7 | 0.8 | 1.1 | 1.25 | 1.4 | 1.5 | 1.6 |
|  |  | Surface hardness (Shore D) | 15 | 23 | 30 | 35 | 54 | 64 | 78 |
|  |  | Wearing resistance (hot wearing test) | 11 | 5 | 0.8 | 0.3 | 0.3 | 0.2 | 0.4 |
|  |  | Evaluation of spalling resistance | 11 times | 9 times | 11 times | 14 times | 10 times | 5 times | 2 times |

Several embodiments and/or experiments of the invention were explained above in detail. A person skilled in the art can easily add many modifications to these embodiments and/or experiments, without essentially deviating from the novel teachings and advantageous effects of the invention. Accordingly, these many modifications are included in the scope of the invention.

U.S. application Ser. No. 12/612,278 and the documents described in the specification are incorporated herein by reference in its entirety.

What is claimed is:

1. A process for producing a base material for obtaining therefrom ring-shaped disks for use in forming a disk roll, the process comprising the steps of:
   (1) forming a raw slurry material consisting essentially of more than 30% by mass to about 70% by mass of mullite fibers comprising $Al_2O_3$ and $SiO_2$ in a ratio that $Al_2O_3:SiO_2$ is from about 60:about 40 to about 99:about 1, about 2% by mass to about 30% by mass of Kibushi clay, 2% by mass to 20% by mass of bentonite, more than 25% by mass to about 40% by mass of mica, and one or more members selected from an organic binder, organic fibers and a flocculant,
   (2) forming the raw slurry material of step (1) into a platy shape, and
   drying the plate formed in step (2) thereby producing a base material.

2. The process for producing a base material according to claim 1, wherein the mullite fibers have a wet volume of about 300 mL/5 g or larger.

3. The process for producing a base material according to claim 1, wherein the mullite fibers are amorphous or have a degree of crystallinity of about 70% or lower.

4. The process for producing a base material according to claim 1, wherein the mullite fibers have an average fiber diameter of about 2 μm-about 7 μm.

5. A method for producing a glass, the method comprising conveying glass on a disk roll, the disk roll comprising a rotating shaft and a plurality of ring-shaped disks fitted thereon by insertion, wherein a peripheral surface of the ring-shaped disks is a conveying surface of the disk roll, the disks consisting essentially of more than 30% by mass to about 70% by mass of mullite fibers comprising $Al_2O_3$ and $SiO_2$ in a ratio that $Al_2O_3$:$SiO_2$ is from about 60:about 40 to about 99:about 1, about 2% by mass to about 30% by mass of Kibushi clay, 2% by mass to 20% by mass of bentonite, more than 25% by mass to about 40% by mass of mica, and one or more members selected from an organic binder, organic fibers and a flocculant.

6. A process for producing a base material for obtaining therefrom ring-shaped disks for use in forming a disk roll, the process comprising the steps of:

(1) forming a raw slurry material consisting essentially of more than 30% by mass to about 70% by mass of mullite fibers comprising $Al_2O_3$ and $SiO_2$ in a ratio that $Al_2O_3$:$SiO_2$ is from about 60:about 40 to about 99:about 1, about 2% by mass to about 30% by mass of Kibushi clay, 2% by mass to 20% by mass of bentonite, and more than 25% by mass to about 40% by mass of mica, (2) forming the raw slurry material of step (1) into a platy shape, and drying the plate formed in step (2) thereby producing a base material.

7. The process for producing a base material according to claim 6, wherein the mullite fibers have a wet volume of about 300 mL/5 g or larger.

8. The process for producing a base material according to claim 6, wherein the mullite fibers are amorphous or have a degree of crystallinity of about 70% or lower.

9. The process for producing a base material according to claim 6, wherein the mullite fibers have an average fiber diameter of about 2 μm-about 7 μm.

10. A method for producing a glass, the method comprising conveying glass on a disk roll, the disk roll comprising a rotating shaft and a plurality of ring-shaped disks fitted thereon by insertion, wherein a peripheral surface of the ring-shaped disks is a conveying surface of the disk roll, the disks consisting essentially of more than 30% by mass to about 70% by mass of mullite fibers comprising $Al_2O_3$ and $SiO_2$ in a ratio that $Al_2O_3$:$SiO_2$ is from about 60:about 40 to about 99:about 1, about 2% by mass to about 30% by mass of Kibushi clay, 2% by mass to 20% by mass of bentonite, and more than 25% by mass to about 40% by mass of mica.

* * * * *